US009898780B2

(12) United States Patent
Bornhofen et al.

(10) Patent No.: US 9,898,780 B2
(45) Date of Patent: Feb. 20, 2018

(54) METHOD AND SYSTEM FOR THE ISSUANCE OF INSTANT CREDIT

(71) Applicant: CITIBANK, N.A., New York, NY (US)

(72) Inventors: Bob Bornhofen, Peachtree City, GA (US); Luke Byrne, Green Cove Springs, FL (US); David Bray, Hagerstown, MD (US); Richard Elder, New York, NY (US); Richard Feight, Sioux Falls, SD (US); Kathleen Hill Pinnola, Middletown, NJ (US); Faye Shimshi, Plainview, NY (US); Ray Quinlan, Fairfield, CT (US); Mark Cheeseman, Martinsburg, WV (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 14/498,267

(22) Filed: Sep. 26, 2014

(65) Prior Publication Data

US 2015/0073975 A1 Mar. 12, 2015

Related U.S. Application Data

(63) Continuation of application No. 09/544,459, filed on Apr. 7, 2000, now Pat. No. 8,918,338.

(Continued)

(51) Int. Cl.
*G06Q 20/24* (2012.01)
*G06Q 20/26* (2012.01)
(Continued)

(52) U.S. Cl.
CPC .......... *G06Q 40/025* (2013.01); *G06Q 20/24* (2013.01); *G06Q 20/26* (2013.01); *G06Q 20/355* (2013.01); *G06Q 20/403* (2013.01); *G06Q 40/02* (2013.01)

(58) Field of Classification Search
CPC .......... G06F 19/00; G06F 17/60; G06Q 30/00
See application file for complete search history.

(56) References Cited

U.S. PATENT DOCUMENTS

| 5,569,897 A | 10/1996 | Masuda |
| 5,644,727 A | 7/1997 | Atkins |

(Continued)

FOREIGN PATENT DOCUMENTS

| WO | 96/19355 A1 | 6/1996 |
| WO | 97/22073 A1 | 6/1997 |
| WO | 98/36917 A1 | 8/1998 |

OTHER PUBLICATIONS

Jeffs, J. A. (2005). Payment systems and global financial order (Order No. NR07821). Available from ProQuest Central; ProQuest Dissertations & Theses Global. (276526017). Retrieved from https://search.proquest.com/docview/276526017?accountid=14753.*

(Continued)

*Primary Examiner* — Muriel Tinkler
(74) *Attorney, Agent, or Firm* — Eric L. Sophir; Dentons US LLP

(57) ABSTRACT

A method and system for the issuance of Instant Credit has an Instant Credit engine that performs instantaneous analyses. The method and system can operate along side existing "batch" processes. In addition, the method and system offer various channels of distribution for the Instant Credit products. With the present invention, Instant Credit and other Instant services (e.g., instant account balance transfers, etc.) can be obtained via, Internet, point-of-sale and other distribution channels. The present system also enables highly dynamic product offerings, which can be generated "instantaneously" based on a variety of factors, such as, for example, the channels of distribution (e.g., telephone or (Continued)

Internet), the product sought and/or even the particular individual and/or entity that is applying for a line of credit.

16 Claims, 9 Drawing Sheets

Related U.S. Application Data

(60) Provisional application No. 60/128,542, filed on Apr. 9, 1999.

(51) Int. Cl.
  *G06Q 40/02* (2012.01)
  *G06Q 20/34* (2012.01)
  *G06Q 20/40* (2012.01)
  G06Q 40/00 (2012.01)
  G06K 5/00 (2006.01)
  G06F 19/00 (2011.01)

(56) References Cited

U.S. PATENT DOCUMENTS

| | | | | |
|---|---|---|---|---|
| 5,777,306 A * | 7/1998 | Masuda | ............... | G06Q 20/342 |
| | | | | 235/375 |
| 5,797,133 A | 8/1998 | Jones et al. | | |
| 5,883,452 A | 3/1999 | Masuda | | |
| 5,930,764 A | 7/1999 | Melchione et al. | | |
| 5,949,044 A * | 9/1999 | Walker | ............... | G06Q 20/10 |
| | | | | 235/379 |
| 5,999,914 A * | 12/1999 | Blinn | ............... | G06Q 30/02 |
| | | | | 705/14.1 |
| 6,018,724 A * | 1/2000 | Arent | ............... | G06F 21/645 |
| | | | | 705/39 |
| 6,084,953 A | 7/2000 | Bardenheuer et al. | | |
| 6,144,948 A * | 11/2000 | Walker | ............... | G06Q 10/02 |
| | | | | 705/38 |
| 6,327,577 B1 * | 12/2001 | Garrison | ............... | G06Q 20/10 |
| | | | | 705/35 |
| 6,519,571 B1 | 2/2003 | Guheen et al. | | |
| 7,472,074 B1 * | 12/2008 | Walker | ............... | G06Q 10/02 |
| | | | | 705/26.82 |
| 2002/0032674 A1 * | 3/2002 | Semple | ............ | G06F 17/30241 |

OTHER PUBLICATIONS

McNally, M. M. (2008). Trial by circumstance: Is identity theft a modern-day moral panic?(Order No. 3326965). Available from ProQuest Central; ProQuest Dissertations & Theses Global. (304387468). Retrieved from https://search.proquest.com/docview/304387468?accountid=14753.*

Boris, Larry. People vs. Machine: A Case for Automated Tracking Systems. Credit World; May/Jun. 1992; 80, 5; ProQuest Central. p. 23.

Weatherington, Richard. Credit Scoring and Credit Unions—A Growing Marriage of Necessity. Credit Union News; 15, 6; Aug. 25, 1995. p. 1.

Anonymous. Are you a target for identity theft? Consumer Reports; Sep. 1997; 62, 9; ProQuest Central; p. 10.

"Outsources Offers Instant Card Approval," Crdit Risk Management Report, vol. 8, Issue 22, Nov. 16, 1998.

"First Data Helps Card issuers Make Instant Credit Available Through the Internet," PR Newswire, Jun. 23, 1999.

"Instant Credit Makes for Murky Waters—Don't Sacrifice Security for Competitive Edge," Credit Risk Management Report, vol. 9, Issue 13, Jul. 12, 1999.

Canadian Office Action dated Jul. 10, 2013 corresponding to Canadian Patent Application No. 2,304,293, 3 pages.

* cited by examiner

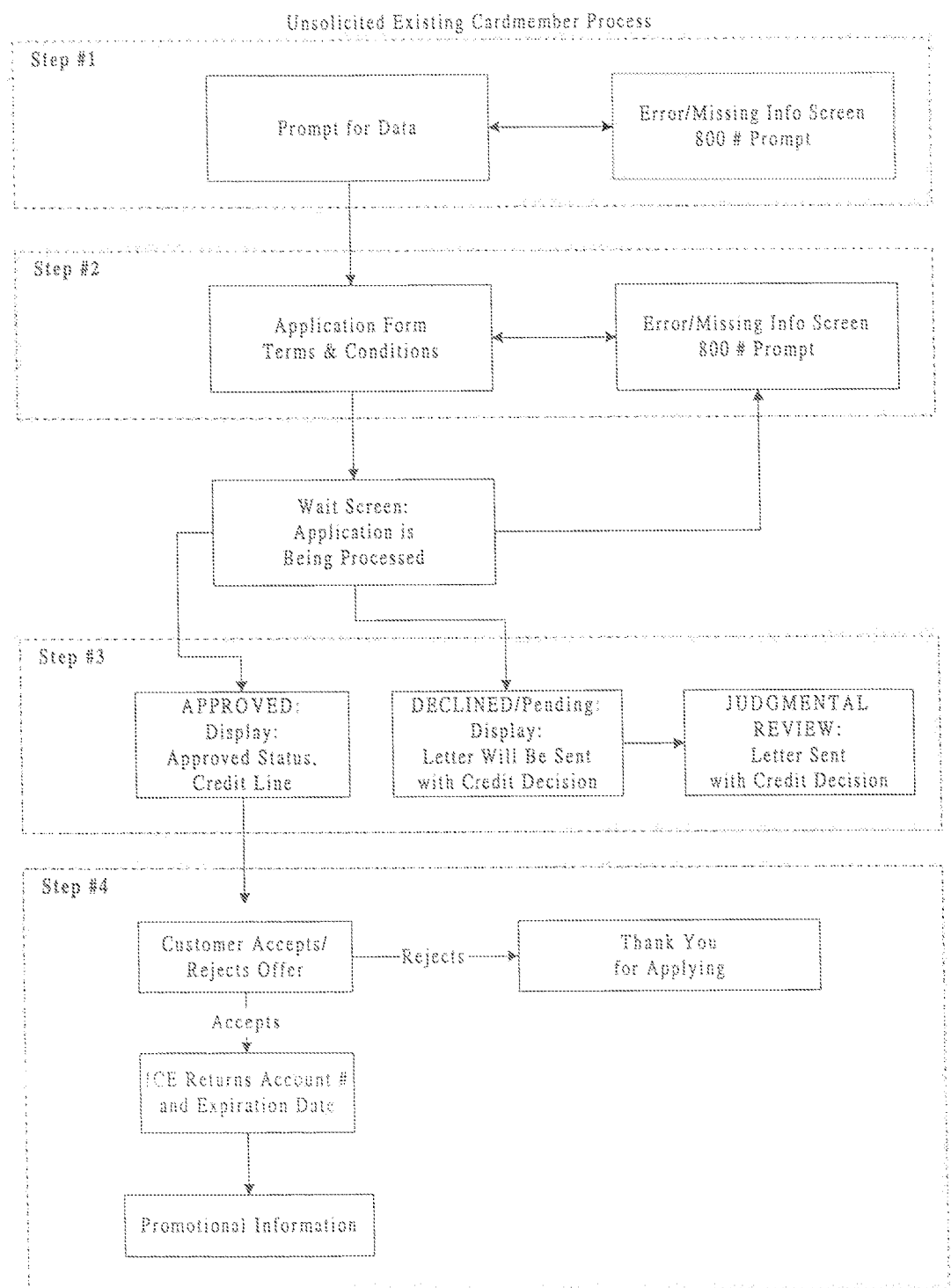

METHOD AND SYSTEM FOR THE ISSUANCE OF INSTANT CREDIT

CROSS-REFERENCE TO RELATED APPLICATIONS

The present application claims is a continuation application of U.S. patent application Ser. No. 09/544,459, filed Apr. 7, 2000, entitled Method and System for the Issuance of Instant Credit, which claims priority to U.S. Provisional Application Ser. No. 60/128,542, filed on Apr. 9, 1999, entitled Method and System For The Issuance of Instant Credit, which are incorporated by reference in their entirety herein.

BACKGROUND OF THE INVENTION

1. Field of the Invention

The present invention relates generally to the issuance of credit accounts for individuals and/or other entities and relates, more specifically, to the issuance of credit card accounts for rendering financial purchases against a line of credit at a financial institution.

2. Description of the Related Art

Historically, individuals have applied for credit cards largely by mail. The credit card acquisition process has typically been an involved and time-consuming process, requiring significant time invested by the Applicant in accurately completing the form and by the card issuer in rendering a decision. In order to encourage individuals to take the time to fill out applications, credit card issuers have forwarded multitudes of application forms to the public on a daily basis. Credit card issuers have also commonly placed credit card forms in various public places for presentment to potential Applicants. In fact, it is fair to say that even today, these mail-in credit card application forms can be found nearly "everywhere."

Faced with the time-consuming nature of the application process and the "inundation" of sometimes bothersome credit card forms, individuals are often reluctant to take the time to obtain new lines of credit and/or to close-out existing accounts even if more appropriate lines of credit may be available.

While other means have been developed for obtaining lines of credit, including on-line and telephone application processes, such other means are limited and/or remain highly time intensive. Some exemplary existing systems are seen, for example, in: U.S. Pat. No. 5,777,306 to Masuda (showing a method and system for issuing a store specific credit card to a customer immediately after the submission of a credit application); U.S. Pat. No. 5,883,452 to Masuda (showing a method and system for issuing a store specific credit card to a customer immediately after the submission of a credit application); and "Outsourcer Offers Instant Card Approval," Credit Risk Management Report, Vol. 8, Issue 22 (Nov. 16, 1998) (discussing a system for notifying Web credit card Applicants of credit decisions in an instant, but where customers whose credit applications are approved receive credit cards within 24-48 hours after submission of their application.).

There remains a need for individuals and/or other entities to be able to apply for lines of credit "instantly" and via "various" distribution channels. Moreover, there remains a need for instant credit authorization for credit cards owned by multiple issuer associations, such as VISA™ and Mastercard™. These associations and their card approval and product purchasing processes create difficulties for the issuance of instant credit, and which processes are out of the control of individual issuers. There also remains a need for systems whereby credit card issuers can more positively promote their credit card product lines with minimal public disturbance and at times and places where their promotions are—in fact—desirable and helpful.

SUMMARY OF THE INVENTION

The present invention provides various embodiments that can overcome the above and/or various other problems and limitations in the art.

According to preferred embodiments of the present invention, a method and system for the issuance of Instant Credit is provided having an Instant Credit Engine that performs instantaneous analyses. With the present invention, Instant Credit and other Instant services (including, e.g., instant account balance transfers) can be obtained by telephone, Internet, point-of-sale and/or other avenues or channels of distribution. The present system also enables highly dynamic product offerings, which can be generated "instantaneously" based on a variety of factors, such as, for example, the channels of distribution (e.g., telephone or Internet), the product sought and/or even the particular individual and/or entity that is applying for a line of credit. The method and system can operate along with existing "batch" processes used by existing multiple issuer associations such as VISA™ and Mastercard™.

According to a first illustrative embodiment of the invention, a method for issuing instant credit to a customer is provided that includes: keying in a credit application; creating an instant credit record; building a credit segment file for the instant credit record; creating an account number; creating a mini-financial record; processing the instant credit record; and applying the credit segment file to a responder record.

According to a second illustrative embodiment of the invention, a method for issuing instant credit to a customer is provided that includes: creating a database of source codes; keying in a credit application; assigning a source code to the application; instantly processing the application within an instant credit engine; determining pricing of a credit product based on the assigned source code; informing the Applicant of the pricing.

According to another illustrative embodiment of the invention, a method for issuing instant credit to a customer and for instantly authorizing balance transfer is provided that includes: entering a credit application; instantly processing and approving the application via an instant credit engine; and instantly authorizing account balance transfer to the approved account.

According to another illustrative embodiment of the invention, a method for issuing instant credit to a customer is provided that includes: entering in a credit application; creating an instant credit record; building a credit bureau segment file for the instant credit record; creating an account number; instantly pre-populating an electronic wallet with information particular to the customer pertaining to the customer's created account number; displaying the electronic wallet to the customer.

According to another illustrative embodiment of the invention, a method for issuing instant credit to a customer is provided that includes: soliciting the customer to apply for an instant credit product; upon the customer's application for instant credit, determining that the customer was solicited for instant credit; determining the pricing of the solicited product for the customer based upon the particular solicitation presented to the customer; providing different pricing of the solicited product to another customer that applies for that product, but that was not solicited therefor.

The above and other features and advantages of the present invention will be further understood from the following description of the preferred embodiments thereof, taken in conjunction with the accompanying drawings.

BRIEF DESCRIPTION OF THE DRAWINGS

The present invention is described with reference to the accompanying figures, which are used by way of reference and not limitation, and in which like reference numerals indicate like parts, and in which:

FIG. 5 is a flow diagram illustrating electronic credit processing for non-solicited existing card members;

DETAILED DESCRIPTION OF THE PREFERRED EMBODIMENTS

First Aspect of the Invention (e.g., Instant Credit at the Merchant's Point of Sale)

According to a first aspect of the invention, a credit card can be instantly approved at the physical location of a retail establishment or merchant. Preferably, the retailers are used as "third-party" vendors of the credit accounts and facilitate the application for the instant credit. The retailers can pass data to the credit card company to set up the account on the credit card company's credit card system.

Figure 1:
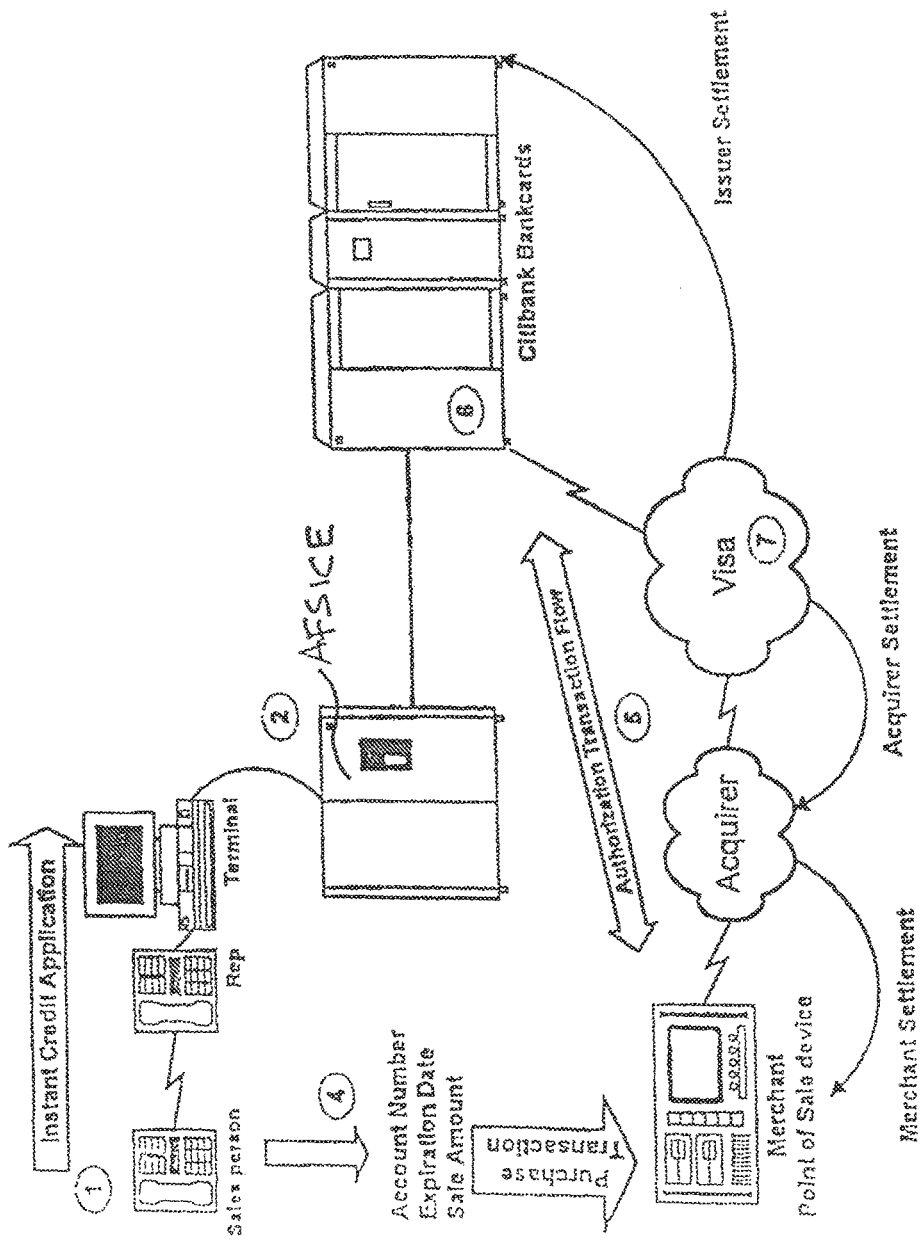
FIG. 1(A) is a schematic diagram illustrating the overall process flow according to a first embodiment of the invention.
FIG. 1(B) is a flow diagram illustrating the separate processing of instant and non-instant applications and the entering of both records into a batch system responder record.
Figure 1:
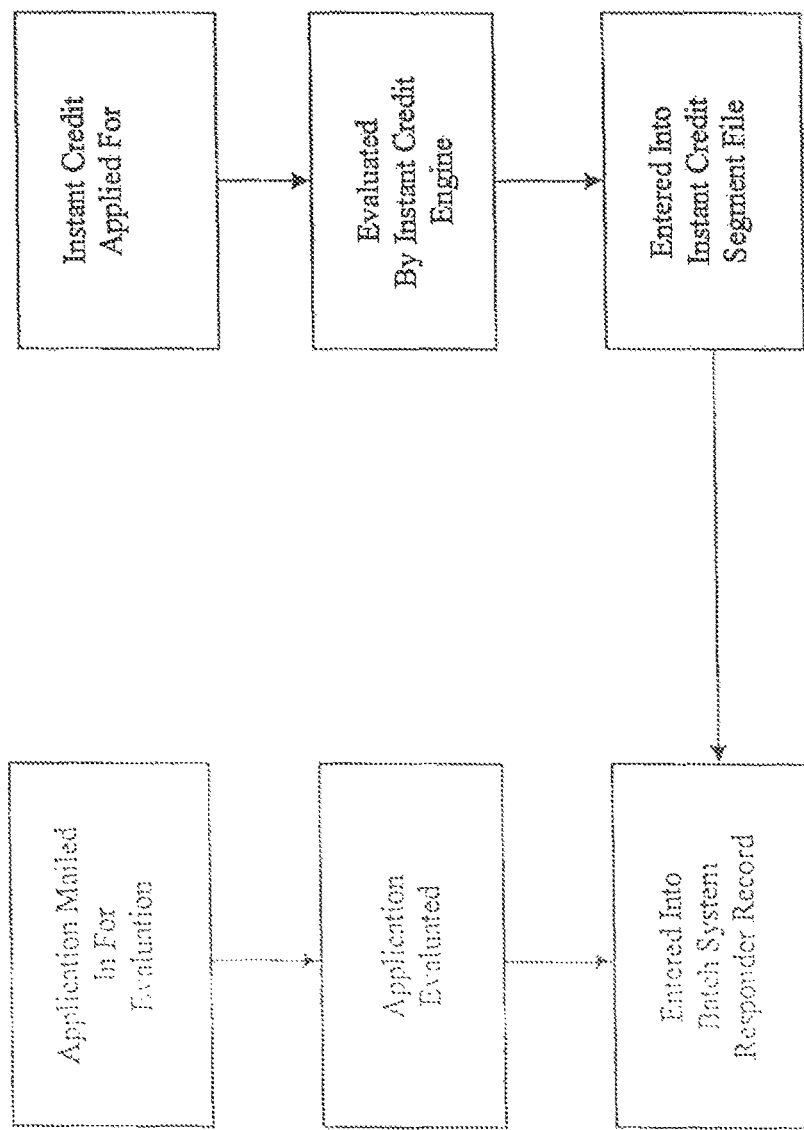
Figure 2:
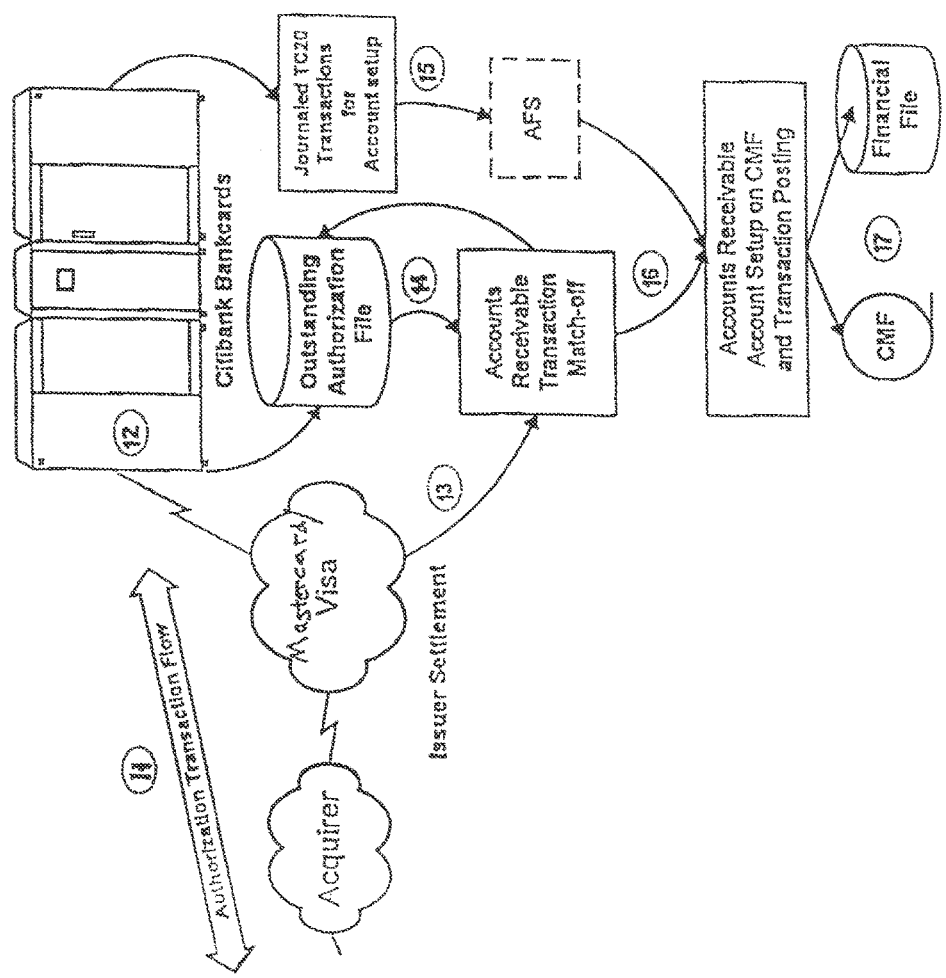
FIG. 2 is a schematic diagram illustrating features related to the process shown in FIG. 1(A), but focusing on aspects related to the posting and treatment of records for Accounts Receivable.
Figure 3:
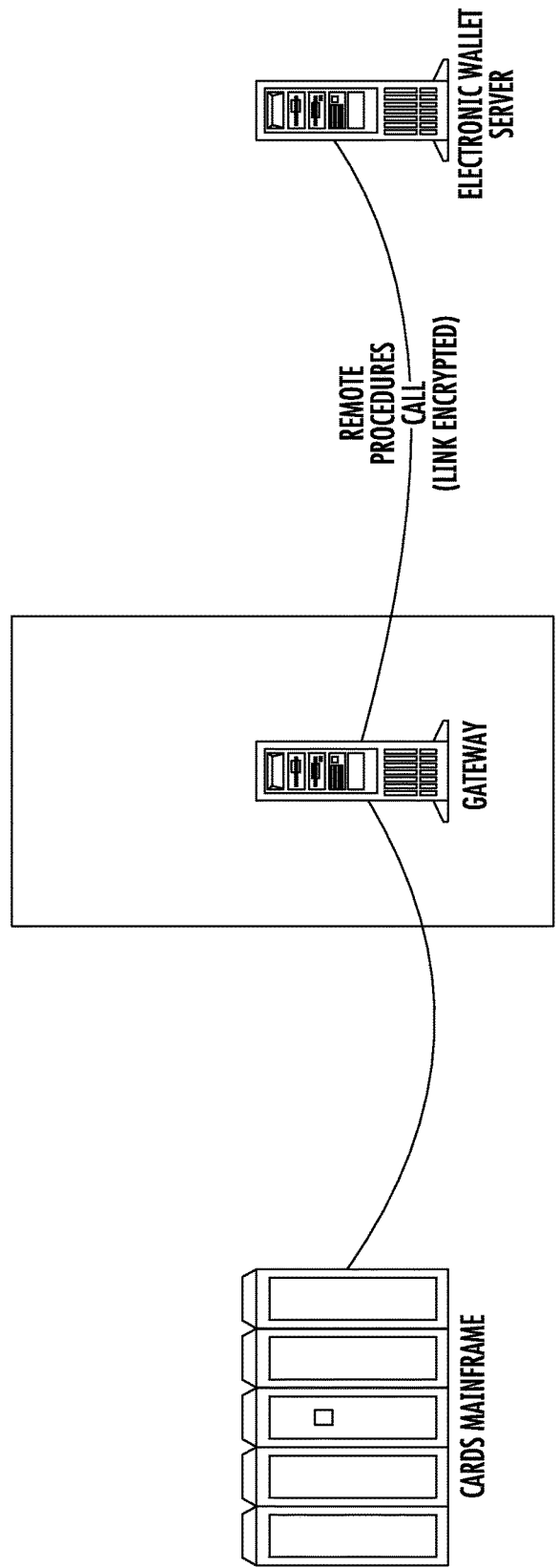
FIG. 3 is a flow diagram illustrating the incorporation of instant credit and electronic wallet capabilities.

FIGS. 1A and 2 show one illustrative method of implementing this first aspect of the invention. It should be understood that various modifications can be made to the illustrated and described embodiments set forth herein. As shown at 1, the retailer's sales person contacts the representative of the Mass Customization Center (MCC). Alternatively, rather than having the sales representative operate as a mediator with the MCC representative, the customer may pass information (e.g., by telephone or otherwise) directly to the MCC representative (see, e.g., various embodiments discussed below). In the example shown in FIGS. 1A and 2, information is preferably transmitted to-and-from the MCC representative via telephone, but it is contemplated that any known form of communication could be used, such as, for example, via e-mail, network connections and/or other means (see, e.g., various embodiments discussed below). Preferably, the MCC representative then keys in the information at the representative's terminal or personal computer. The representative's personal computer then transmits the keyed-in information to the system 2. Preferably, the system 2 performs the "instant" processing of the information from the MCC representative via an Instant Credit engine or module. That is, the system 2 preferably takes the information from the inbound sales call and begins a credit review process—e.g., including credit bureau checks, credit scorecards, etc., to review credit worthiness. Preferably, the system 2 will process the credit application using the bankcard's credit criteria and preferably contains all, or substantially all, required external interfaces for sending and retrieving information from third parties for credit evaluation.

Preferably, the system provides at least two potential outcomes—approved or declined. If the application is approved, the system 2 forwards the transaction, including, for example, account setup data to an application that processes the account setup data. An account number is assigned by calling an Account Fulfillment System (AFS) on-line module. The account number and expiration date are forwarded to the MCC representative who then relays this information to the sales representative over the telephone. A mini-financial record is created for initial purchase authorization. The system records and journals the required data to create a transaction for account setup to be processed in batch and sent to posting for complete account setup. Preferably, the transaction sent from the system 2 contains all of the information necessary to create a mini-financial file record that has all of the necessary fields to process an authorization, except for the account number.

As shown generally at 4, immediately after the instant authorization, the sales representative can use this information, plus the purchase amount of a selected product, to key-in the purchase transaction (e.g., manually) via a known merchant point-of-sale device (e.g., located, e.g., at a Merchant's check-out isle). At that point, as shown generally at 5, the purchase transaction can follow the normal authorization request and response route—e.g., via an acquirer and Visa™ and Mastercard™. As shown generally at 6, the bankcard host will process the transaction utilizing the newly authorized mini-financial file. Preferably, subsequent transactions against the account are blocked until the account is fully setup. That is, preferably the account only allows one initial transaction to be made up to the credit amount. Preferably, the purchase transaction is settled (i.e., issuer settlement) in the normal automated fashion.

FIG. 2 shows an exemplary flow for the account setup and the posting of the initial purchase. Once again, the authorization transaction flow 11 will be like that described above with reference to numeral 5. As shown at 12, the host system 3 will process the purchase request and log the authorization to an Outstanding Authorization File (OAF) and journal the transaction. As shown at 13, Visa™ and Mastercard™ or the like will settle with the bank (e.g., Citibank® in the illustrated example) at the end of the day, for example, in a usual manner. As shown at 14, an Accounts Receivable Transaction Match-off will be performed wherein Outstanding Authorizations are matched against today's settlement transactions. Matched and non-matched, non-authorized, transactions will be forwarded to posting. As shown at 15, the Instant Credit issuance data received from system 2 that was journaled will be forwarded to Accounts Receivable to establish the accounts. As shown at 16, the Accounts Receivable process will sort the transactions such that the account setup transactions will be processed before the purchase transaction is posted. As shown at 17, at the end of the Accounts Receivable process, the accounts will be established and a full-financial file record will be created. The mini-financial record will expire. Then all usual account establishment steps (e.g., forwarding a plastic credit card, a welcome kit, etc., to the Applicant) will occur.

In preferred embodiments of the first aspect of the invention, an Instant Decision tool is provided within an Account Fulfillment System Instant Credit Engine (AFSICE) that allows for an immediate account approval and setup that will allow an authorization to be made the same day at the point of sale.

The AFSICE enables applications to be entered into the system and to have the entire credit decision process occur real-time. As shown schematically in FIG. 1(B), this real-time processing in the AFSICE system occurs independently of the existing AFS system—i.e., the existing "long term" decision system in which applications are, e.g., mailed to the credit company which renders credit decisions and batches credit records on a daily or other periodic basis. Preferably, the AFSICE system operates real-time up to providing approval. More preferably, the AFSICE system operates real-time up to providing an actual account number (e.g., providing the user with an actual account number rather than a mere indication of approval). More preferably, the AFSICE system operates real-time up to even creating a financial file (hereinafter "mini-financial file") to allow the user to make payments against the financial file that same day—i.e., upon the creation of the mini-financial file record.

As discussed above, the first aspect is preferably utilized at a point of purchase (i.e., at a merchant's location) at which a customer or user is about to make a purchase (e.g., at line at a cashier or at a customer assistance desk at the merchant's location, etc.). According to another embodiment, similar to that described above, the method can also be carried out generally as follows.

First, the Applicant fills in a written application form at the Merchant site. Alternatively, this form can be filled in electronically (e.g., at a computer terminal) by the Applicant.

Second, the merchant telephones or otherwise contacts (e.g., via e-mail) the Mass Customization Center of the credit card company.

Third, the MCC representative fills in (e.g., at a computer terminal) the fields filled out in the Applicant's form and sends the data electronically to the AFSICE. (Alternatively, the representative may not need to actually type in these fields—e.g., if the Applicant has already electronically entered the data and forwarded the same to the MCC representative.)

Fourth, preferably the AFSICE performs on-line edits to ensure that valid information is entered. Preferably, the AFSICE also performs a real-time read of a Mandatory Variable Table. Required missing fields are then preferably highlighted for the MCC representative so that the information can be provided at that time by the Applicant applying for the credit card.

Fifth, the AFSICE preferably creates an Instant Credit record that is processed real-time through the AFSICE system.

Sixth, the AFSICE renders a decision:
a. If the credit record is approved:
1. MCC representative will inform Applicant of approval;
2. Assigned credit limit and terms and conditions will be displayed to the MCC representative, and the representative will inform the Applicant thereof;
3. If the Applicant accepts this offer, the MCC representative will key this in and the AFSICE will create:
i) an account number;
ii) a temporary expiration date; and
iii) a mini-financial record.
4. Preferably, only one transaction is allowed on the same day the mini-financial file is established and for an amount under the credit limit.
b. If the credit record is denied or queued for further review:
1. The MCC representative will advise the Applicant that the company will get back to them with a decision and that Instant Credit is not available.

Seventh, the Instant Credit records are brought into the existing AFS process during the batching of the AFS records. The existing batch AFS process involves long-term (e.g., usually greater than one day) processing, based on applications via telephone and/or mail, etc., which are batched into a responder record periodically (e.g., daily). The credit segment created at the AFSICE will be applied to the responder record during the batching of the existing AFS records. That is, the Instant Credit record is processed through the AFSICE real time and is brought into the batch AFS process for further processing. The AFS system can include, for example, a table in the front end that, depending on codes on the AFSICE Instant Credit records, will identify which records from the AFSICE should be declined, should be pended or queued for manual review. If the record is identified as having a declined code, for example, a decline letter can then be mailed via the existing AFS process. If the record is identified as having a queued code, the record will be queued—e.g., along with other records to be queued for review from the existing AFS process. If the record is identified as having an approved code, the AFS system will send the record to Accounts Receivable. A "welcome membership" letter will be forwarded to the approved Applicant. The credit segment that was created during the real time process will be applied to the responder record. All reason codes, score values and information generated during real-time AFSICE process can be applied to the responder record.

The AFSICE will have an on-line data capture interface module to allow the MCC representative to enter or forward the application data for submission. The interface module preferably allows for real-time transfer of information between the MCC and the AFSICE.

Preferably, the MCC representative will be provided with a search means for on-line searching for an approved application. Preferably, the search means locates credit records that were approved that same day.

Preferably, the Applicant will not be allowed to place a second Applicant on the account at the point-of-sale. In this case, to add another individual to the account, the Applicant should later contact customer service to add the individual after the initial account is set up.

In further detail, according to specific embodiments of this aspect, the credit record can preferably be processed through the AFSICE using at least some, preferably all, of the following review steps:
1. Highlighting of Required and Mandatory Variables
Preferably, the AFSICE will not create an Instant Credit record until omitted mandatory information is entered into the system. Required fields preferably include, for example, product/brand code information and employment indicator information. In addition, the AFSICE also preferably runs a program to find errors within certain fields to ensure that they contain valid information.

If there is an omission and/or error, the AFSICE will display to the MCC representative a message to correct the highlighted fields. The MCC representative will be required to enter the field before continuing further in processing. Preferably, if the fields are not corrected, the MCC representative will delete the Instant Credit record.

2. Duplicate Application Status Check

Preferably, the AFSICE will perform a duplicate application status check to confirm that the same Applicant has not recently unsuccessfully attempted to apply for a credit card. This will help ensure that only one Instant Credit application per applicant can be processed per day. In this regard, the AFSICE will preferably immediately create and update an AFSICE Dupe App file.

If there is not a match with the Dupe App file, the Instant Credit record may continue processing. Preferably, the Dupe App file is updated during batching (e.g., daily) into a monthly Dupe App file created during existing AFS processes. Preferably, the AFSICE also compares the application to the monthly Dupe App file as well as a daily Dupe App file created with respect to the existing AFS system so that checks are made against applications that are applied for outside of Instant Credit applications—i.e., using existing longer-time-period methods.

If a duplicate application is located, if desired, rather than merely declining the application, the AFSICE may continue processing, but it may stop before the mini-financial setup. Then, a message can be forwarded to the MCC representative that the card issuer will respond with a decision. Upon further evaluation, depending on circumstances, credit may be issued. However, Instant Credit will be declined.

3. Front End Edits Check

The front end edits checks can include, for example:

Minimum Age/Income;

Unacceptable Addresses; and

Social Security Number (SSN) Validation.

In brief, preferably, the AFSICE provides front end edits that render a conclusion based on certain determined information. For example, the AFSICE may set minimum age and/or income levels for Instant Credit.

Preferably, if the Instant Credit record passes all front end edits, it will continue processing through the AFSICE. If the Instant Credit record fails one or more front end edits, then the application can be declined (e.g., decline codes can be added to the record and, thus, applied within the responder record of the AFS process during batching for processing the appropriate decline letter) or the record can continue through the AFSICE processing without the option of Instant Credit, but with the possibility of approval upon further evaluation and processing (e.g., queue codes can be added to the record and, thus, applied within the responder record of the AFS process during batching for queuing the record for judgmental, e.g., manual, review).

4. Risk/Region Assignment

Preferably, the AFSICE also performs a risk/region assignment check.

5. ECM Status Check

Preferably, the AFSICE also performs a search-evaluation to determine whether the Applicant is an Existing Card Member (ECM).

Preferably, ECM criteria is used to evaluate the Applicant. Preferably, the ECM criteria can be customized (e.g., is editable on-line or the like). For example, this will enable the credit company to flexibly customize the general ECM criteria, including, e.g., the maximum income, maximum cards, and maximum credit line based on the product source code.

Preferably, certain criteria are deemed "hard" criteria in that failure to meet results in a hard decline. In that case, e.g., the AFSICE will stop processing and when the record is brought into the batch process a hard decline letter will be sent out. Preferably, in some cases (such as where the salary income is above a certain level and/or with "soft" declines, etc.), the AFSICE may continue processing but stop before the mini-financial setup such that the record is not eligible for Instant Credit, but may potentially be "queued" for manual review when brought into the batch process.

If the Applicant has a good account history, the record will continue processing and may potentially be "instantly" approved.

6. Fraud Check

Preferably, the Instant Credit record is also processed real-time through a fraud check. This check preferably includes a comparison real-time to a fraud database/file and/or a home Zip Code comparison to a high risk Zip Code table/file.

Preferably, even if there is a match found, the record may continue processing. For example, in some cases, the AFSICE can continue processing but stop before the mini-financial setup such that the record is not eligible for Instant Credit, but will potentially be "queued" for manual review when brought into the batch process. Preferably, in some cases, even if there is a match found, depending on other findings in the AFSICE process, the record may potentially still be instantly approved.

7. Credit Bureau Check

Preferably, a credit bureau request will be generated and sent to the credit bureau real time. Preferably, this credit bureau check occurs after processing through the Duplicate Check, the First Review Edit, the ECM and/or Fraud checks. Preferably, if there is no response/hit at a credit bureau, the system will send out another request to a second credit bureau.

If the credit bureau returns a "perfect match" based on pre-selected criteria, then the Instant Credit record continues and is potentially instantly approved. In one exemplary embodiment, the perfect match criteria can include checking to see that there is a perfect match (e.g., the same or nearly the same in some cases) on the application for at least some of the following:

name

SSN address (numeric portions)

time at that address state zip code address (alphabetic portions)

date of birth

If the credit bureau reports a fraud victim warning, the record preferably continues processing, but is not available for Instant Credit. In that case, the record is brought into the batch system and queued for manual review. If it passes manual review, then the record will process to posting and will be approved. If it fails manual review, then the record will process to decline and a decline letter will be issued.

If there is a failure to receive a credit bureau report, preferably the application is not instantly approved, but is brought into the AFS system during batching and processed therein through the credit bureau analysis.

8. Credit Bureau Disaster Check

Preferably, the credit bureau information returned to AFSICE will be evaluated real-time using disaster check tables having predetermined disaster criteria.

If the Instant Credit record does not fail this check, the record will continue to process through the AFSICE and may ultimately be instantly approved.

If the Instant Credit record fails this check, Instant Credit will not be permitted and the AFSICE will inform the MCC representative that the card company will respond with a decision. Preferably, after batching, if the Instant Credit record meets certain criteria (e.g., high income level), then the application may potentially be approved at a later date. If not, the Applicant will be forwarded a decline letter after batching.

9. Credit Risk Scoring

Preferably, the AFSICE system scores the Applicant's application utilizing a scorecard. A scorecard is a list of criteria in accordance with which an Application is scored. Preferably, the system can use more than one scorecard, wherein the scorecards are selected based on circumstances. Preferably, the scorecards can be imported based on conditions—e.g., are dynamic.

If the Instant Credit record score is greater than or equal to the score cutoff of the applied scorecard, the record will continue processing through the AFSICE and can, thus, potentially be instantly approved.

If the Instant Credit record score is less than the score cut off, the record is preferably stopped from processing through the AFSICE. No further processing steps will be performed via the AFSICE. Preferably, when such a record is brought into the batch AFS process, if the Instant Credit record meets criteria for a high-income exception, the record will be queued for further judgmental (e.g., manual) review. In which case, the application could potentially be approved, although not instantly. In that case, the application would continue processing via the AFS processing blocks.

10. Fraud Profiles

Preferably, further fraud profile tables are read and compared to the Instant Credit record. If there is a match with any one of these tables, preferably the record continues processing through the credit bureau and checkpoint systems (e.g., Experian™). Preferably, if, for example, there is a perfect match at the credit bureau, or a good match on Experian™ or another condition, the record may still potentially be instantly approved.

11. Debt Burden Scoring

Preferably, the AFSICE also performs debt burden scoring based on the ratio (e.g., %) of the debt (e.g., reported at the credit bureau) to the income.

If the Instant Credit record does not fail the debt burden score, it will continue processing through the real-time process and can potentially be instantly approved.

If the Instant Credit record fails the debt burden score, the record will stop processing in the AFSICE. Preferably, when such a record is brought into the batch AFS process, if the Instant Credit record meets criteria for a high-income exception, the record will be queued for further judgmental (e.g., manual) review. In which case, the application could potentially be approved, although not instantly. In that case, the application would continue processing via the AFS processing blocks.

12. Credit Line Assignment

Preferably, the credit line assignment will be set utilizing credit line assignment tables. In some exemplary embodiments, the credit line assignment can be determined, e.g., as follows.

For ECMs: Max Credit Limit from ECM Table–(minus) Total ECM Credit Line=(equals) Eligible Credit.

If Eligible Credit is less zero, the record is not instantly approved.

If the Eligible Credit is greater than zero, but less than the minimum credit line allowed for the product, then depending on circumstances, the processing may be continued for potential instant credit approval, or it may be passed to judgmental review.

13. Secondary Check (e.g., Experian Checkpoint™)

Preferably, if the Instant Credit records a) pass Credit Bureau Disaster, b) pass Credit Scoring, c) pass Debt Burden Scoring, d) have been assigned a credit line>=minimum acceptable for the product, and e) were not a perfect match at the credit bureau, then a real-time lookup request is sent to an outside check system (e.g., Experian Checkpoint™ system). If there is not a good match on these, the AFSICE will display a message to the MCC that Instant Credit approval is not available. However, preferably the ICE process continues processing.

14. Verification Requirements

The AFSICE preferably also has a comparison table to enable Applicants that fail certain checks (e.g., disaster or score checks) may be queued for further review and, thus, potentially receive Approval. For example, records with poor Credit Bureau Disaster, Risk Score and/or Debt Burden scores may potentially be approved after being brought into the batch process and proceeding to judgmental review based on a high-income exception.

In some cases, additional verification may be required. For example, Employment Verification and/or Income Verification may be desired in some cases. Preferably, the AFSICE includes tables that set forth verification needs for certain Instant Credit records based on several factors, such as including occupation, risk and points margin.

For example, if employment, income and/or verification is required, the record will stop processing and the MCC representative will be instructed that the credit company will respond with a decision. Then, the record is brought into batch processing and the record is queued for judgmental (e.g., manual) review. If the queued record passes judgmental review, it may process directly to the posting block because it already processed through all AFS processing blocks during AFSICE processing. The account number will be assigned and the record will be passed on to Accounts Receivable. If it fails, a decline letter is sent.

15. Mini-Financial Setup

If the Instant Credit record passes through the AFSICE, the AFSICE will return (e.g., display) the Assigned Credit Line and a message such as, e.g., "approved; press X to complete approval process" to the MCC representative. At this point, the MCC represent can approve or cancel the application.

If the Applicant accepts the account, and the MCC representative presses the corresponding key, the AFSICE will instantly approve the application. Then, the mini-financial setup is created, including: a) the assigned account number; and b) a temporary expiration date.

The MCC representative then informs the merchant thereof.

The MCC representative will also inform the merchant if the Assigned Credit Line is less than the Requested Purchase Amount.

The merchant then writes down (or prints out) the account number and expiration date for the customer. That is, no actually "hard" credit card is received at that time.

The customer then brings their merchandise to the merchant's cashier and presents the new account number and expiration date.

The cashier then submits the authorization back to the credit company.

The authorization is approved.

The customer purchases the merchandise with the new Instant Credit.

When an Instant Credit record is approved and receives an account number, a new account number will not be assigned when processed after batching. After such approval, the system will preferably, among other things, notify the Applicant of the new application by mail so as to ensure that the Applicant is not a fraud victim. The record will be forwarded to Accounts Receivable for a complete account setup. The record preferably appears on the AFS responder file and can be displayed on-line after batching.

In most preferred embodiments, the response time is preferably typically less than about 60 seconds in order to provide an apparently "instant" decision. This time period can, in some cases, be longer depending on circumstances. Most preferably, the response time is almost always less than about 60 seconds.

The segment record that is created in the AFSICE system can include, for example, at least some and preferably all of the following information:

reference number;
MCC representative's operator ID;
The merchant store's name;
The merchant store's number;
The merchant store's employee number;
The purchase amount;
The Applicant's ID #;
The Applicant's ID Type;
The Applicant's ID expiration date.

The segment record also preferably includes, for example, at least some and preferably all of the following information that is obtained (e.g., via the checkpoint):

The primary result code;
Address verification result code;
Address unit mismatch result code;
Phone verification result code;
Address type result code;
Address high risk result code;
Phone high risk result code;
Change of address result code;
SSN result code;
Audit number.

Second Aspect of the Invention (e.g., Instant Electronic Credit for the Internet)

According to a second aspect of the invention, an Instant Credit decision is provided for applications made by, for example, existing card members (ECMs) and/or to pre-selected individuals.

This second aspect is most preferably utilized with a specialized line of credit for Internet commerce (e.g., an E-Card) having a product that internally functions like a credit card, but that would be packaged, delivered and supported like a virtual electronic credit line. A non-traditional plastic card, without a magnetic stripe, will be issued as a reference vehicle for card members who chose this product. The plastic card is preferably lasered, rather than embossed, with the same information as a standard card. This product is not designed for use in physical locations (e.g., at merchant's sites), but it may be used for Internet sales, mail and telephone orders or the like. Nevertheless, this second aspect is not limited to this preferred form of credit card and, in other embodiments, can be applied to any form of credit card or the like.

According to one embodiment, this new form of credit is made available by way of an Instant Credit application only to existing bankcard members and/or to pre-selected individuals. This enhances creditworthy/fraud analyses.

Preferably, in this aspect, the Account Fulfillment System Instant Credit Engine (AFSICE) is adapted to provide a permanent expiration date from Accounts Receivable, rather than a temporary expiration date as in the preferred constructions of the first aspect described above. Preferably, in this aspect, the system is also adapted to allow multiple credit purchases, up to the credit limit, upon Instant Credit issuance, rather than only one purchase as with some of the prior described embodiments. Preferably, Customer Service will have the ability to look up newly established account information for the same day until batch processing runs at night.

To enable card member authentication, preferably an existing card member (ECM) file is created for, at least, each ECM that is targeted for a product (e.g., via mailed solicitation materials or the like).

Preferably, upon an existing-card-member verification, an electronic Instant Credit Application form (e.g., whether at the MCC representative or over the Internet) is pre-populated with at least some information.

Preferably, certain ECM specific information populates in the background (i.e., is not displayed to the Applicant) for use by customer service to ensure that an individual calling in has proper entitlement.

I. Exemplary Internet Process Flows

According to one application of the second aspect, a vehicle is provided for both solicited and unsolicited existing customers to apply for electronic-credit via the Internet. The following sections outline the Instant Credit procedures for such Internet applications. There are generally three main categories of customers who might apply for electronic credit: solicited existing card members; unsolicited existing card members; and unsolicited prospects.

The Internet strategy provides for three venues for customers to apply for electronic credit based upon the above-mentioned categories. Preferably, existing card members, whether they are solicited or unsolicited, are offered instant authorization, and unsolicited prospects are offered instant decisioning. Instant authorization includes instant decisioning, i.e. instant authorization captures and processes the customer's information, returns an approval for the credit line or a pending notice (even if the customer is declined, the return message will state the customer will be contacted via mail), and based upon customer acceptance of the credit line offered, returns an account number and expiration date available for immediate use. Instant decisioning permits the customer to submit their application for processing and will return an accepted or pending message, but not an account number or expiration date. Preferably, unsolicited prospects will be instant decisioned, but they will not be able to utilize their electronic credit until they receive the account number and expiration date in the mail.

Prospects and ECM callers who have not been solicited will be processed using the AFSICE. They will go through the normal account acquisition process for non-targeted prospects—e.g., the account will be scored, disaster checked and assigned a line. Preferably, the prospects will be screened for at least one or more, preferably all, of the following:

duplicate application
number of accounts
front end edits
unacceptable addresses

ECM account status
disaster
scoring
credit line assignment
product identifier table Preferably, the solicited web application will verify the customer has been solicited and that they are an existing card member. After these two verifications have taken place, the web application will display the appropriate application form based on the category of user.

The AFSICE will respond with an approval status and, if approved, a credit line. After the user has accepted the offer, the web application will forward the customer's acceptance/declination response to the AFSICE. If the customer accepts the offer, the AFSICE preferably returns account number and expiration date for solicited and unsolicited ECMs only.

The following sections further illustrate exemplary features and/or steps in the various processes with respective Applicants.

A. Solicited Existing Card Member ("ECM") Application Process

Figure 4:
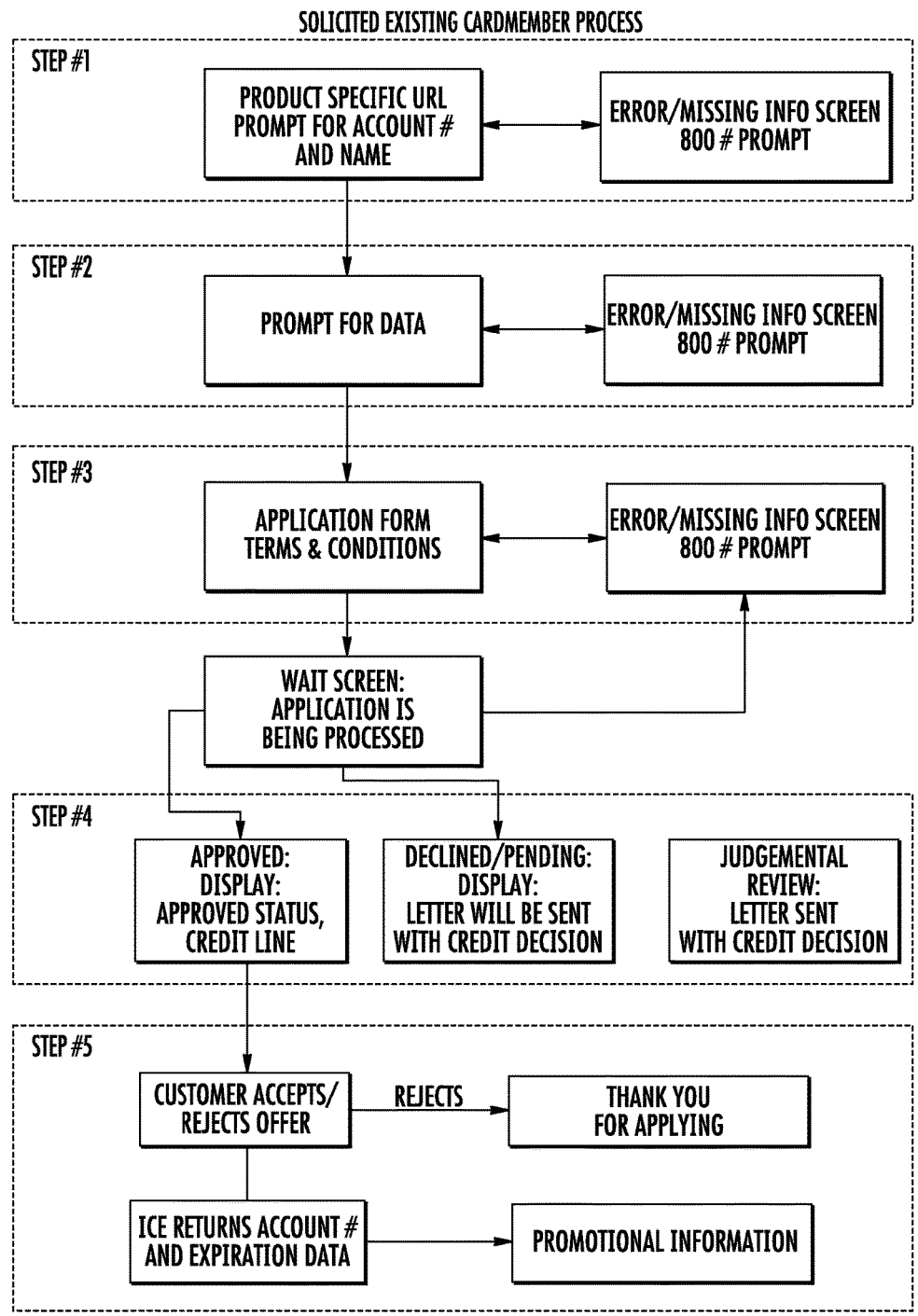
FIG. 4 is a flow diagram illustrating electronic credit processing for solicited existing card members.

As shown in FIG. 4, the application process for solicited ECMs is preferably carried out as follows.

Step 1

1. First, the bank card company solicits the customer by mail or other means and directs the customer to a URL (encrypted page) specific to their solicited ECM product. Preferably, there will be one URL for each solicited ECM product.
2. Upon visiting the URL, the customer is prompted to enter their account number and name as it appears on their existing card.
   a. the account number and name are verified against a web-server table:
   i) if the account number and name are incorrect, the customer is given the MCC center telephone number to call;
   ii) if the name and account number are correct, the solicitation code is returned and a secure transient cookie is set on the customer's computer and the customer is taken to step #2. (Alternatively, rather than placing a cookie, the system can request that the user provide identifying information.)

Step 2

1. Depending on circumstances, the system can utilize the BIN portion of the account number to determine what verification path a user will take—e.g., to see if the card is from a particular bank portfolio.
2. A customer can then be requested to enter verification information. This is verified against an internal database.
3. If the verification check is returned as incorrect, an error message is displayed along with the 800 number for the Mass Customization Center (MCC).
4. If the verification check is completed successfully, the name and account number are verified against a solicitation file table. If properly verified, the process proceeds to Step #3.

Step 3

1. At this point, the customer is presented with an online application form.
2. A number of fields are preferably pre-filled, such as: name, address, city state, and zip code.
3. The customer fills in the form, and the form is validated for syntax; any errors are displayed on form and corrections are requested. If a customer does not complete a mandatory field or has syntax errors, an error form appears.
4. The customer must check the "I have read and accept the Terms & Conditions" check box before the application form will be submitted to the ICE.
5. Completed application is transmitted to ICE for Instant Credit decisioning:
   a. ICE will evaluate the application using a credit bureau and determining if any disasters were added since the mailing list (under which the ECM was solicited) was created. If new disasters are on the bureau, the application will be declined.
   b. For solicited ECM's, the score cutoff will preferably be set to zero.

Step 4

1. If ICE returns an error code, the customer is presented with a decline response and directed to the 800 number for the Mass Customization Center (MCC).
2. If ICE returns a decline or judgmental review is required, display a message informing customer that communication will be forwarded via mail. ICE will generate an existing DCF decline letter specific to the reason for decline or approval by judgmental review.
3. If ICE approves the application, ICE will return the credit line to the Internet GUI for the customer's use.

Step 5

1. At this point, the user either accepts or declines the offer.
2. If the user accepts the offer, an acceptance is sent back to ICE. Then, the ICE returns the account number and expiration date. Instructions on card usage, links to an electronic wallet and other products can be promoted at this point. Preferably, the user is provided with an authentication message for an electronic wallet and the account information is preferably made available and waiting within the electronic wallet.
3. If the user declines the offer, a customer withdrawal message is sent to ICE. No account number or expiration date will be provided to the user.

B. Non-Solicited Existing Card-Member Internet Application Process

The unsolicited process will follow the same flow as the solicited ECM with the following differences:

There will be no eligibility check for the solicitation.
The customer will enter his/her name as it appears on the credit card and their account number. This will be verified against databases. If verification is passed, the user continues.
Preferably, unsolicited existing card members will be presented with all terms and conditions and RICA information that is required.

C. Non-Solicited Prospect (i.e., Non-Solicited Non-ECM) Application Process

In this embodiment, unsolicited non-ECM Applicants are preferably not allowed to receive Instant Credit authorization. However, the unsolicited prospects may, in some embodiments, receive an instant decision, but not an instant authorization. In that case, the actual account information will not be provided until after processing through batch AFS. In the latter case, as shown in FIG. 5, the unsolicited prospects preferably can apply via the following process.

Step 1

1. The customer is presented with an online application form with the same fields as the unsolicited existing card member application.
2. The unsolicited prospects application contains the RICA and Terms and Conditions.
3. The customer input is validated for syntax, and any errors are displayed on form and corrections requested. If a customer does not complete a mandatory field or has syntax errors, an error form appears.

4. The customer must check the "I have read and accept the Terms & Conditions" check box before the application form will be submitted to ICE. If the customer does not check the "checkbox" they will be forwarded to a "thank you" page.
5. Completed application is transmitted to ICE for credit decisioning.
6. ICE will evaluate the application using a credit bureau and the user driven tables. If new disasters are on the bureau, the application will be declined.

Step 2
1. If ICE returns an error code, the customer is given a decline response and direct them to the 800 number for the Mass Customization Center (MCC).
2. If ICE returns a decline or judgmental review is required, a message is displayed informing the customer that communication will be forwarded via mail. ICE will generate an existing DCF decline letter specific to the reason for decline or approval by judgmental review.
3. If ICE approves the application, ICE will return the credit line to the Internet GUI for the customer's use.

Step 3
1. The customer must accept or decline the application. In either case, the customer's response is forwarded to ICE.

II. Exemplary Telephone Process Flows

A. Solicited ECM Process Flow

In certain embodiments, the Instant Credit application may be applied for via telephone by an ECM that has received solicitation materials from the bank. In these cases, the flow process can include, for example, the following:

1. A customer will call via a toll free number the Mass Customization Center (MCC). Alternatively, the MCC may solicit the customer by initiating the call.
2. The customer provides their name and/or solicitation number.
3. If the MCC representative does not locate the account, the representative will refer the customer to call customer service.
4. If verified, an Instant Application option will be presented to the MCC representative.
5. The MCC representative will be presented with a screen to enter a product name and/or source code.
6. The Instant Credit application should then be presented to be filled in by the MCC representative based on the product name and/or source code. For ECMs, preferably a number of fields are automatically populated into the form to faciliate processing.
7. The MCC representative takes all other application form information.
8. The MCC representative then submits the form to the ICE for processing.
9. The terms and conditions will be displayed (such being based on the source code and product). The customer then accepts or rejects the card.

B. Non-Solicited ECM Process Flow

The non-solicited ECM will follow a similar flow, except that verification of the solicitation is not performed, but verification is only confirmed as to the existence of the customer's existing account.

Preferably, the non-solicited ECM is responding to an advertisement or solicitation such that they have received terms and conditions.

C. Non-Solicited Non-ECM Process Flow

In this embodiment, non-solicited non-ECM Applicants are preferably allowed to receive an instant decision, but not an instant authorization. In that case, the actual account information will not be provided until after processing through batch AFS.

III. Instant Application of Electronic Wallet

According to one embodiment of the invention, the AFSICE will interface with an electronic wallet in a manner to instantly "pre-populate" an individual wallet for each account holder. Electronic wallets can be used to contain various financial account information to facilitate rendering of payments. They can reside in a variety of locations, such as on a user's personal computer or on a separate secure server.

Preferably, the ICE will interface with an electronic wallet server. As shown, the ICE to wallet interface is initiated at the bankcards mainframe. Upon processing an Instant Credit application, the ICE sub-system within the bankcards mainframe will initiate communication (e.g., an LU6.2 conversation or the like) to an existing gateway. This will fire an electronic application which will receive a formatted message from the ICE. The formatted message will contain the IP address of the electronic wallet server.

In order to pre-populate an electronic wallet for a new E-Card account holder, the AFSICE thus transfers certain data to the electronic wallet server upon making an Instant Credit approval. The following are fields preferably output to the electronic wallet:
last name
first name
address 1
address 2
city
state
zip code
home phone
business phone The output of an approved ICE account is also the account number and the expiration date (and in some cases a frequent flyer number). This information can be transferred to the electronic wallet.

Preferably, a new daily report is created that details the numbers of 1) approved accounts by the AFSICE, 2) ICE record transfers to an electronic wallet, and 3) electronic wallet accounts created.

Third Aspect of the Invention (e.g., Non-Pre-Screened Mailings and Non-Solicited Applicants)

According to a third aspect of the invention, an Instant Credit decision is provided for applications made by, for example, non-pre-screened mailings and non-solicited Applicants.

The above-described aspects included, among other things, Instant Credit issuance for Merchant Point-of-Sale (Merchant POS) and Internet and phone applications. This third aspect provides, among other things, instant decisions/authorizations via the Internet or phone, and also the ability to offer a wider variety of products, personalized product offerings, and to permit both Instant Authorization and Instant Balance Transfer transactions.

Moreover, this third aspect allows the Applicants to apply for a specific product offering via the Internet and to obtain an Instant Decision and, in some cases, an Instant Authorization Among other things, this aspect provides the infrastructure to support inbound direct response to NPS mailings and other media using telemarketers and the Internet, as well as to provide the necessary tools for Instant Authorization. This makes Instant Decision/Instant Authorization available beyond Merchant POS and solicited ECMs for electronic credit or the like, and also creates the infrastructure to allow personalized card offerings through inbound telemarketing and Internet, to expand verification tools, and also to expand existing Merchant POS functionality.

In some embodiments of this third aspect, the front end of the AFSICE, the Internet services, and the Universal Customer Support System's (UCSS) graphical interface (i.e., the front end graphical user interface for customer sales/service) may be expanded to allow, for example:

1. The ability to make a credit decision prior to knowing the specific product for which an Applicant is applying.
2. The ability to offer Instant Decisions/Authorizations against various credit card products.
3. The addition of non-established scorecards for credit decisioning.
4. The addition of the NPS (non-established) batch scorecards.
5. The ability to utilize Revenue scorecards (with neutralized occupation coding).
6. The ability to have multiple line assignments (by individual product).
7. The ability to pass credit line information (trade details, etc.) from ICE to both UCSS and the Internet for sales leveraging and balance transfer verification purposes through use of the trade line window.
8. The ability to allow an Instant Balance Transfer at time of approval from the Host perspective, for the Internet, and for UCSS.
9. The ability for AFSICE to obtain alternate bureaus when the primary bureau is unavailable.
10. Additional verification tools to allow testing of Instant Authorization for Prospective Card Members (PCMs).
11. The ability to allow Merchant Remote third party vendors to connect their customers into the Instant Credit Engine to allow Instant Authorization on the Internet.
12. The infrastructure to allow Applicants to apply for a specific product via the Internet and to obtain an Instant Decision/Authorization.
13. The infrastructure to accept balance transfer requests and process them according to a rule set (some requests could be processed immediately, while others may be pended).
14. The ability to automatically generate trouble reports (TR) at the Help Desk for Internet issues.
15. The creation of an NPS Mail-base (indexed by Invitation Number) which ICE can access to determine if an offer and if an appropriate disclosure has been made, such that, for example, Instant Balance Transfer and Instant Authorization could be processed.
16. The creation of a process to pend balance transfer requests until the Applicant has received the necessary disclosure.

This third aspect is most particularly advantageous for use with non-pre-screened (NPS) mailings and unsolicited individuals, and includes using ECM criteria when an existing customer applies for a new card.

I. Scorecards

Preferably, in addition to the foregoing ICE scorecards and revenue scorecards as they exist for the above aspects, additional scorecards will be used to support the appropriate credit decisions therefor. The preferred embodiments allow expanding the capability of AFSICE to full service NPS capability. Although a variety of scorecards exist, each respective Applicant is preferably only scored based on one selected scorecard for a particular product at a particular time.

Preferably, the system applies an appropriate scorecard based on the product, the product source code and/or other criteria. For example, different scorecards could be used based on different responses to inquiries, such as a response to the question "are you a frequent flyer and/or do you have frequent flyer number" can drive the application to certain scorecards and a response to the question "what is the time at your present employer" can drive the application to determine which of the non-established scorecards should be used. Preferably, a generic scorecard can also be provided—e.g., to enable a user to apply prior to even selecting a product.

II. Line Assignments

Whether the Applicant is applying for a specific product (i.e., a particular type of credit card offered by an issuer) or for a personalized offer (i.e., wherein the Applicant can select at least some features to personalize a credit card to suit the Applicant's needs), the AFSICE most preferably provides both a line assignment and maximum credit line—this enhances flexibility.

III. ECM Verification Procedures

If the Applicant is an ECM, ECM Verification will take place. Preferably, once an Applicant has passed ECM Verification, further address (PV) and/or Identify Verification will not be necessary to make him/her eligible for Instant Authorization (or Instant Balance Transfer). The procedures used for ECM Verification may be, for example, similar to that described with reference to embodiments hereinabove.

The automated existing card member (ECM) search/evaluation that is performed against the relationship files in batch AFS and AFSICE can be utilized. This will allow Credit Policy the flexibility to customize the general ECM criteria, including maximum income, maximum cards, and maximum total credit line based on the product source code. It will also allow Credit Policy the ability to "turn off" certain ECM reason codes. Preferably, any updates to application criteria will be submitted via a project change request (PCR).

IV. Credit Decision-Making

The output of the Credit Policy Review process will include the credit decision—e.g., approve, decline or queue. This decision can then be used in conjunction with any need to capture Balance Transfer information from the Applicant in order to complete the instant transaction. Approved and queued applications will have both a credit line and a maximum available credit line assigned. The maximum allowable credit line can be utilized to determine a contingent credit line, at the time of account application. This can allow sales leveraging for Instant Balance Transfer purposes. The declines will return the reason code, which will be interpreted to send the correct DCF letter. For applications that are approved or given conditional approval, the credit line and the maximum line will be passed to AFS Batch so that when the account is set up the information can be posted on the CMF and in Accounts Receivable. Customer Service will access the maximum credit line when a new card member whose application was taken via ICE calls in to provide balance transfer information.

Specific product applications will follow a path similar to the second aspect with respect to electronic credit discussed above. An application will be submitted and evaluated against specific credit criteria. Assuming the Applicants creditworthiness, ICE will perform the necessary systemic verifications and will obtain a decision of approved, declined or queued. ICE will then output to UCSS or the Internet the decision. If the application is approved, ICE will provide the credit line and maximum credit line associated with the application. ICE will also pass credit bureau detail to be used for Balance Transfer leveraging and verification as needed. This detail includes the member name, the account number, the date opened, limit, balance, and status. The final credit line will be determined using the logic like that discussed above regarding line assignments. The Applicant's acceptance of the offer and the credit line will be passed to ICE. Where Instant Authorization is available, ICE will respond by providing the account number and expiration date.

V. NPS Mail File Match

A match to a Non-Pre-Screened (NPS) Mail-base is performed when the Applicant calls in or the like to determine if he is calling in response to an offer, and if so, to determine to which offer the Applicant is responding. This also enables the determination of whether the Applicant has a RICA in hand for Instant Balance Consolidation/Authorization functionality.

VI. Source Code Determination

Preferably, the source code is dynamically selected based on circumstances.

For example, if the Applicant is responding to an NPS mailing, the source code may be selected from the NPS Mail-base as described above. On the other hand, if the Applicant is not responding to an NPS mailing, he may be given the ability to select an offer from a menu of advertised offers (which provides the source code based on the product/offer selected). Otherwise, generic source codes may be assigned.

VII. Personalization

In the personalization flow, the Applicant preferably provides information about what, other than pricing, is important to him/her in a credit card. An Applicant will choose between reward structures and card services (e.g., buyer's protection, extended warranty, travel insurance) to determine the value proposition that most suits him/her.

When the information has been gathered, the system presents the product that most closely matches the Applicant's stated needs. If the Applicant agrees, personalization continues. If not, the system needs to clarification to determine the correct product. If for some reason, the Applicant is not interested in any of the products, the application is withdrawn.

If the Applicant enters the personalization flow but will only allow the processing of an application the rate is stated first, then the system will quote a certain rate. If the Applicant agrees to be decisioned based on that criteria, the generic source code for that criteria will be assigned and the decision will be rendered via a Product Specific stream.

Preferably, the application for personalization will include a series of questions about frequent flyer membership. Preferably, one of the questions can include if the Applicant is a frequent flyer, and if so, for his airline affiliation and frequent flyer number. Regardless of the airline affiliation, if an Applicant answers that he is a frequent flyer, the application is preferably scored with a specific scorecard.

Preferably, in the personalization stream, credit decisions, minimum and maximum credit lines, pricing, and at a later date, balance transfer eligibility are returned via the ICE for all products for which the Applicant is approved or conditionally approved.

VIII. Product Specific Flow

For the product specific stream, the credit decision for all products for which the Applicant is eligible along with the minimum and maximum credit lines, pricing, and at a later date, balance transfer eligibility are preferably returned.

IX. PCM Applications

Preferably, all perspective card member (PCM) applications will ask additional non-multiple-choice questions necessary for Identify Verification.

X. Ice Processing

Preferably, the AFSICE processing will return a credit decision, credit lines, pricing, balance transfer eligibility, and an indication of whether or not the Applicant passed PV.

Preferably, Applicants who do not pass PV may receive a Conditional Approval and any Balance Transfer information collected will be queued until after PV is passed, plastics are mailed, and a defined period has passed that allows the Applicant to receive and review the RICA. Preferably, a new message will be passed back to the Applicant (e.g., via Customer Service and/or the Internet) that indicates the Conditional Approval.

XI. Pricing

For each product for which an Applicant is approved, one price will be returned to the client by the AFSICE. Preferably, the source code associated with the application drives the initial APR offer.

XII. Conditional Approvals

If an application passes credit decisioning, but does not pass PV, the application is preferably conditionally approved. All the output from ICE should still be reflected in the personalized offer screens, but the Applicant will be explicitly told that the approval and credit line amount are subject to verification of certain information.

Instant Authorization will not be an option for this population.

XIII. External Verification Tools

Preferably, ECMs who passed ECM Verification do not need to go through this process and are considered to have passed both Address and Identify Verification.

On the other hand, because applications will now be coming in over the phone and Internet, in addition to point of sale, additional verification tools to support the non-in person identity verification are desired for implementation. Preferably, only non-ECM Applicants and Merchant Remote Applicants are processed through this channel.

XIV. NPS Mail-Base Access

In order to accurately identify which NPS offers an Applicant is eligible for when applying for Instant Credit (e.g., via the Internet, telephone, etc.), preferably the ICE will have access to information on NPS mail-bases to access the source code, if any, of any mailing(s) the consumer received. The original source code, if any, can be used, for example, to determine if: the Applicant has initial disclosure in-hand (e.g., to enable Instant Authorization/Instant Balance Transfer); and the Applicant's offer was for the personalization stream and/or a product specific stream.

The NPS mail-base can be, for example, indexed by Invitation Number (i.e., number provided with invitation mailed to Applicant).

The NPS invitation number, the full source code of the product, and an incentive code can preferably be extracted from the NPS mail-base and passed to ICE, where they will be written to a segment file and passed on for future analytics. Preferably, the NPS mail-base will be read-only.

XV. Exemplary Telephone Processes

According to one illustrative embodiment, callers may be able to call in to the MCC representative in a manner as in the first and second aspects of the invention (discussed hereinabove) for Instant Credit authorization and also may be able to call in to the MCC representative in order to "build their own card" having user selected criteria for only instant decisioning, rather than instant authorization.

XVI. Exemplary Internet Processes

In certain embodiments, the Instant Credit application may be applied for via the Internet. For illustrative purposes, some Internet processes can include, for example, the following steps.

A. Product Specific Flows for Prospective and Existing Customers

Step 1

First, a customer accesses the Internet from a computer, a personal digital assistant, or another device using a webbrowser or the like. Then the customer is directed to a product stream URL (e.g., by entering a URL advertised on a solicitation, by clicking on a banner advertisement, by clicking when browsing the card issuers website (e.g., www.Citibank.com).

Preferably, each product has its own URL. Preferably, in some cases, when a customer comes from a particular banner ad or from a particular other URL, a NPS file check can be bypassed.

Preferably, the customer is prompted to enter their invitation number. Preferably, the invitation number is not a mandatory field. If the customer provides an invitation number, it is checked against the NPS mail file and the solicited source code. RICA indicator (i.e., an indicator of whether or not the customer received specific disclosure information) and incentive code are returned. If an invitation number is not provided, a default product source code is assigned. If the solicited source code returned is for personalization, preferably such personalization is for telephone inquiries only and the Applicant is displayed the MCC number. Alternatively, personalization could also be provided via the Internet in variations of the illustrated embodiments as would be apparent based on this disclosure.

Step 2

If the initiation number is found on the NPS file, the product selected is displayed and the Applicant is asked to confirm if this is the product they are interested in. If so, then the Applicant proceeds. If not, then a list of all products offered are displayed and the Applicant is asked to select which product they are interested in. Based on the Applicant's selection, a specified generic product source code is assigned. The solicited or selected source code values are carried to step 4.

Preferably, the validity of the source code is verified of selected product only (i.e. preferably, not the solicited source code if the customer has chosen to apply for a specific product and was assigned a default source code.) If valid, the Applicant proceeds.

Step 3

The Applicant is prompted to identify if they are an ECM or not. This may be verified as discussed hereinabove. If they are not an ECM and did not fail for name verification reasons, proceed to and display a prospect application in step 4.

Preferably, the account functionality of non-verified ECMs is not hindered, but only their ability to apply for this application.

If the verification check was incorrect, preferably an error message is displayed with the 1-800 number for the Mass Customization Center (MCC).

Step 4

The customer is presented with online application form. Preferably, all fields must be completed and contain valid data. For ECMs, at least some of the fields are preferably pre-filled.

Preferably, the customer's input is validated for syntax, and any errors are displayed on the form and corrections are requested. If a customer does not complete a mandatory field or has syntax errors, an error form appears.

Preferably, the Terms & Conditions are dynamic (e.g., based on source code or product). A template for each product will be provided and query will be made to determine the variable information. Preferably, the customer must check the "Terms & Conditions" check boxes before the application form will be submitted to ICE.

Preferably, if the customer has elected to pursue an offer, a re-verification of the source-code is performed to ensure that the customer has received the offer for which they were solicited.

The completed application is transmitted to ICE for credit decisioning, and as with other embodiments described herein, the ICE will evaluate the application using a credit bureau and the user driven tables.

Step 5

If the ICE returns a pend or decline message, a message is displayed informing the customer that communication will be forwarded via mail.

If the ICE approves the application, preferably multiple products will be displayed with corresponding pricing information. The product that the customer has applied for is selected and assigned the minimum credit line. The system then displays the credit line, any incentives, and appropriate accept/decline buttons for the Applicant. If the ICE conditionally approves the application, multiple products will be returned with pricing information. The product that the customer has applied for is selected and assigned the minimum credit line. The system then displays the credit line, any incentives, and accept/decline buttons.

Step 6

If the ICE provides a conditional approval, a confirmation page is returned showing approval, but no account number and expiration date is provided. If the user accepts the offer, an acceptance is sent back to ICE.

If the ICE provides an approval, then the ICE returns an account number and an expiration date. Preferably, instructions on card usage and links to other products are provided on the user's display screen at this time for promotion. If the user accepts the offer, an acceptance is sent back to ICE.

Step 7

If the user declines the offer, no account number or expiration date will be provided to the user. Preferably, the customer is asked to provide the primary reason why they did not elect to accept the offer. Preferably, a customer withdrawal message and the decline reasons are sent to ICE.

B. Merchant Remote Flow

According to another exemplary embodiment, the Applicant is directed to the credit card website from a remote Merchant. For example, while viewing a remote Merchant's website, the Applicant may click on a banner ad or the like having associated hyperlink coding to direct the Applicant to the credit card website. As another example, the remote Merchant may provide promotional mailing materials or the like identifying the specific URL of the credit card website, or the specific remote Merchant URL of the credit card website can merely be provided without the Merchant directing the Applicant thereto. In yet another example, an Applicant may be physically located at the Merchant's physical place of business (e.g., within their offices, such as at a travel agency or other place of business) and the Applicant and Merchant can access the Merchant URL together. In that case, the Merchant representative and/or the Applicant himself can fill in the necessary fields at the Merchant URL.

Preferably, in some appropriate cases, following confirmation and approval, the Application is provided with a link to return to the Merchant's URL or website. In that manner, the Applicant can, for example, return to the remote Merchant Website to make a purchase, if desired.

According to one preferred embodiment, the process flow can be as follows:

a) the customer accesses a merchant's website via the customer's web-browser software located at his computer or on a network to which his computer is connected;

b) while at the merchant's website, the customer places an order for a product or service (e.g., places the product in an on-line shopping card or the like, etc., and places an order or begins steps towards ordering);

c) the merchant's website can then display an advertisement, window, banner or the like that preferably "pops-up" (i.e., is just then displayed) and offers the customer to apply for an Instant Credit card to make such a payment;

d) the customer then clicks on the display and is linked to the IC application processes according to embodiments described herein.

The merchant's website can also have displays or advertisements therefore that appear even prior to rendering an order in order to encourage the placement of an order. The advertisements could, in some cases, present promotional offerings, rates, etc.

Because the purchase is made over the Internet, the application will preferably receive additional verification as discussed hereinabove. If no additional verification is provided, the Instant Credit application should reside on a secure server of the card issuer, the customer must read Terms and Conditions and click to continue, and if approved, the credit card number and expiration date are preferably posted back on the merchant's order page, visible to the customer. Optionally, the user could be limited to a single transaction.

XVII. Internet Functionality Components

Among other things, the following components will be included for at least some of the Internet Instant Credit embodiments:

Verification of Customer Solicitation on NPS File
Verification of ECMs
Assigning source codes from specific banners (e.g., by, for example, including codes in the banner ad's hypertext link, etc.)
Re-verification of solicitation code before application submission.
Web Application, which can, e.g., be maintained on a separate secure server, will transfer information to and from ICE for processing, e.g.:
  syntax and error checking for application information;
  dynamic generation of application forms based on ECM or Prospect status.
  Log incorrect source code values and e-mail to Help Desk.
  Daily download of AFS source code table.
  Validate source codes from NPS file.
  Dynamically generate Terms & Conditions.
  Dynamically generate Navigation tool bar.

XVIII. NPS Mail File

Preferably, the NPS file will be utilized to determine if the customer has been "solicited". The NPS file will be searched according to invitation number, which is unique to the customer. Preferably, up to eight products should be displayed to the customer.

XIX. Verification of ECMs

As discussed above, ECMs will preferably be verified by comparing against a data file. The web application will interface with the data file.

XX. Validate Source Codes from Solicitation File

As discussed above, the source codes are preferably validated. As a result of possible source code table synchronization difficulties, the system will call to the AFS to return the product table. Preferably, this is done daily in an effort to prevent sending invalid source codes to ICE.

XXI. The On-Line Internet Application Form

As discussed above, the data fields for the on-line application depend on customer category. As also discussed above, the web application will send inputs entered into the application to the ICE for decision processing.

XXII. Syntax and Error Checking of Application Information

As above, preferably, the Applicant's input is validated for syntax, and any errors are displayed on form and corrections requested. Preferably, if a customer does not complete a mandatory field or has syntax errors, an error form appears.

XXIII. Re-Verification of Solicitation Code Before Application Submission

As above, to further prevent, e.g., an unethical customer from "borrowing" another customer's source code, the source code is preferably re-validated against the solicitation table before the application is submitted to ICE. If the validation is successful, the application is submitted. Preferably, if the validation is unsuccessful, the servlet applies the correct solicitation code for customer before submitting the application.

XXIV. Dynamic Terms & Conditions

As above, the Terms & Condition information are preferably generated dynamically based upon the source code. Preferably, the variable T&Cs information is stored in a product code table in the AFSICE. Preferably, the Terms & Conditions only need to be displayed in the following instances:

1. The RICA indicator on the mail file indicates that a solicited Applicant did not receive the information.
2. The customer chooses a different product than what they were solicited for.
3. The customer was not solicited—e.g., if he comes from certain banner ads (i.e., in some cases).

XXV. Assigning Source Codes from Banners

As discussed above, in some embodiments, banner or the like ads can be placed on various other websites—e.g., on websites other than those of the card issuer. These banners ads, etc., can be used as acquisitions tool to direct the customer to the Instant Credit application(s). A source code attached to the URL from the banner should be harvested and used for application processing. Preferably, a remote Merchant that displays such a banner ad or the like must agree and/or guarantee that the source codes used will comply with the AFSICE source code rules.

XXVI. Exemplary Requirements for Static and Dynamic Webpages

Figure 6A:
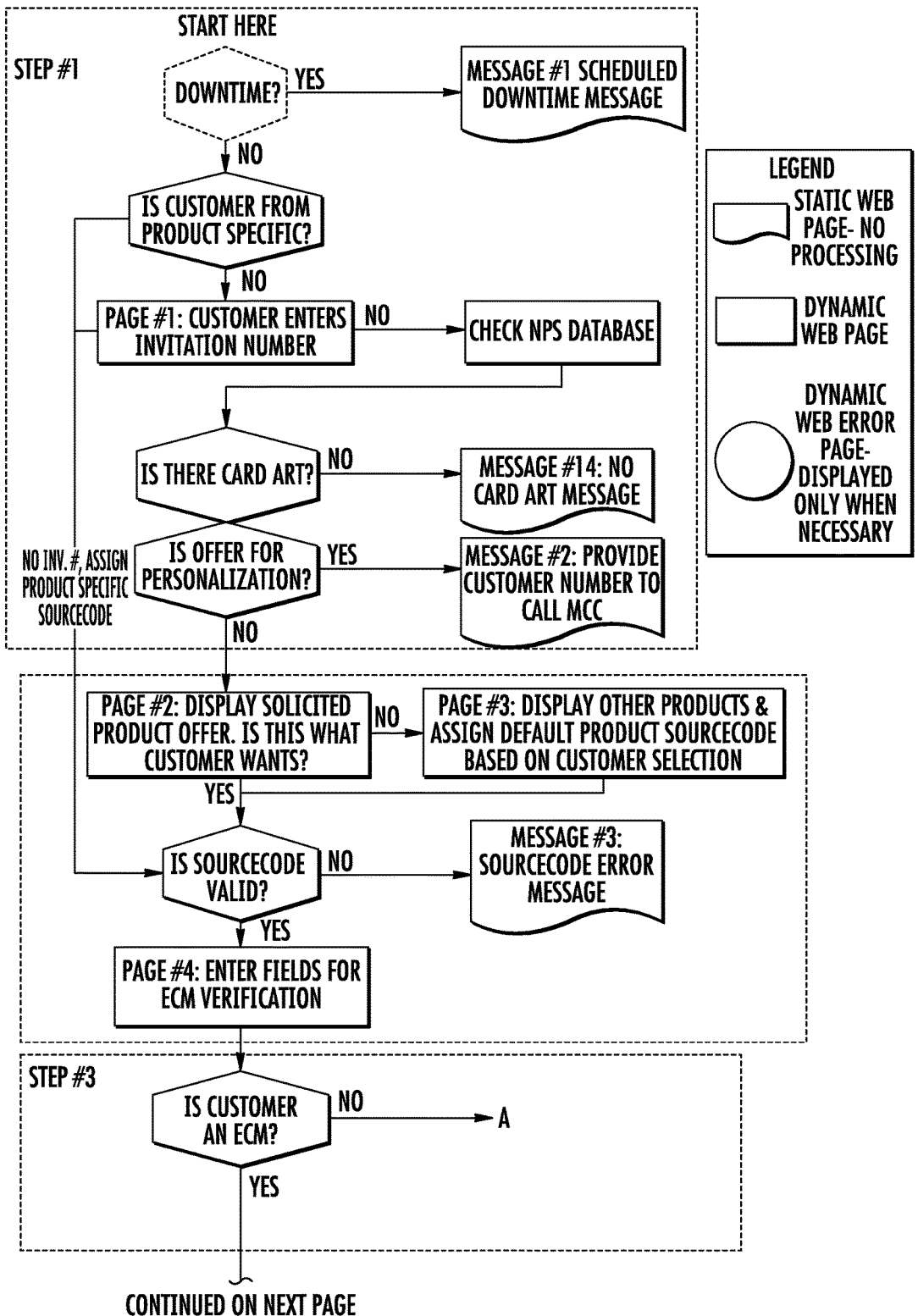
FIGS. 6A-B show exemplary webpages associated with the application procedure according to one illustrative embodiment.
Figure 6B:
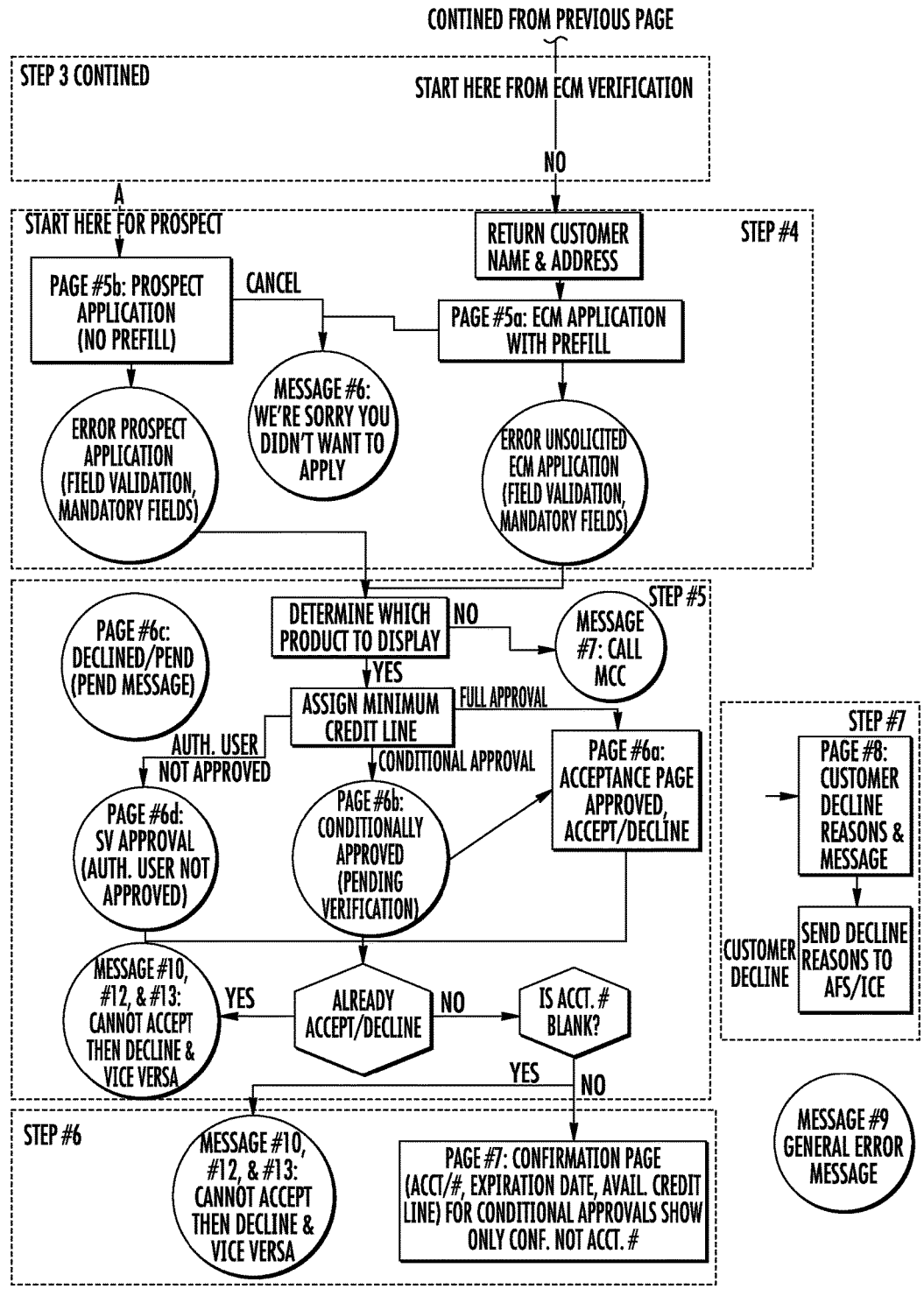

Exemplary static and dynamic webpages associated with the application procedure are illustrated in FIGS. 6A-B.

Preferred features of the webpages shown in FIG. 6 can include as follows:

Page 1 is viewed by ECMs and prospects for the purpose of receiving the customer invitation number. If it is matched on the NPS file, a RICA indicator and a source code are carried therefrom.

Page 2 is viewed by Applicants that were on the NPS file. Preferably, this is done to determine if the customer is requesting the product that they have been solicited for.

Page 3 is viewed by customers that did not accept the solicited offer or were not solicited. This permits the customer to select a default product offer.

Page 4 is viewed by ECMs and is for ECM verification.

Page 5a is viewed by ECMs and provides the application for the ECMs.

Page 5b is viewed by prospects and provides the application for the prospects.

Page 6a is viewed by Applicants that have been fully approved, and it displays the credit line, incentives, and account approval status. The customer is also prompted to accept or decline the offer.

Page 6b is viewed by Applicants that have been conditionally approved, and it displays that they have been approved pending verification. It also displays the credit limit and credit approval status. Again, the customer may also be prompted to accept or decline.

Page 6c is viewed by Applicants that have been pended or declined. It displays that they will receive information regarding the account approval status in the mail.

Page 6d is similar to conditional approval, but is viewed by applications where they are approvable but that a decision cannot be made until the authorized user can be verified.

Page 7 is viewed by approved or conditionally approved Applicants and displays available credit line, total credit line, account # (not for conditionals) and expiration date (not for conditionals).

Page 8 is viewed by customers that decline an offer, whether conditional or fully approved, and provides means for the customer to input reasons for declining.

XXVII. Multiple Instant Credit Functionality Processes

Figure 7:
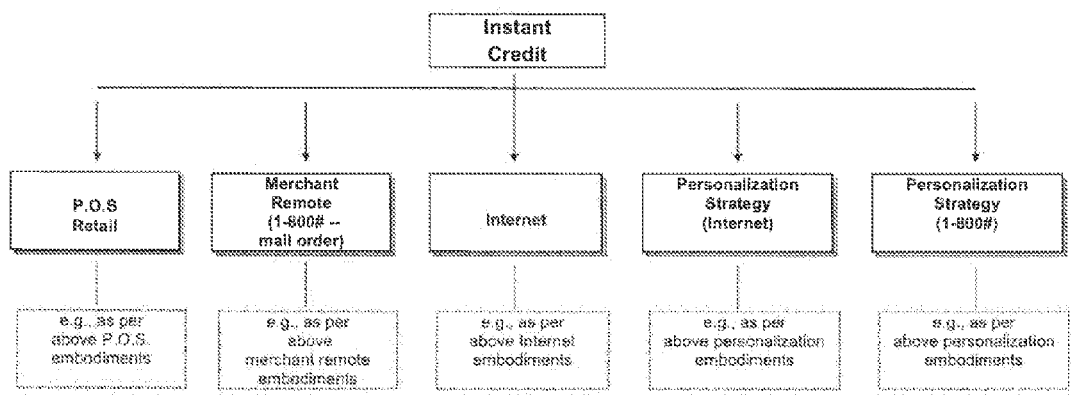
FIG. 7 is a flow diagram illustrating embodiments that will enable customers to obtain Instant Credit decisions through various channels.

The Instant Credit (ICE) functionality can also be used to provide embodiments that will enable customers to obtain Instant Credit decisions through various channels. For example, some embodiments can enable Instant Credit decisions from one or more of the following five different channels, as shown in FIG. 7.

A. Merchant Remote (Mail Order Catalogs, Etc.)

According to another aspect of the invention, Instant Credit is also made available via Merchant Remote (Mail Order) channels in some instances.

In brief, the customer will call the 1-800# or other number of a mail catalog company to place an order. The mail order representative can then offer Instant Credit to the customer. If the customer is interested in applying for the Instant Credit card, the mail order representative will conference in the card issuer (e.g., Citibank) so that the customer can apply for Instant Credit.

Here, there will be a third party on the line (i.e., the mail order representative will remain on the conference call during the application process). If the customer is instantly approved, the card issuer representative will provide the credit card number to the mail order representative to complete the catalog or the like mail order. Preferably, the merchant remote mail order channels embodiment has a single authorization limit for Merchant Remote transactions—e.g., similar to certain Merchant P.O.S. embodiments described herein.

The Merchant Remote process will preferably mirror the Merchant POS process/capabilities. For example, the same scorecard, Instant Credit application and "single authorization" policy will preferably apply. However, because, in this case, the customer will not be at a retail location when applying additional verification of identity is desirable in preferred embodiments.

B. Travel-Related Merchant POS and Merchant Remote (Travel Related Reservations)

Here, the functionality should operate in the same manner as the foregoing Merchant POS functionality, with the exception that certain specific application that must be captured. This Merchant POS functionality is intended to leverage the opportunity to offer the card while a customer is making travel reservations in person at a travel agency, or the like. A drivers license check will occur at POS to provide identity verification. A single Instant Authorization will apply as in other Merchant POS processes.

This functionality will allow the card issuer to leverage the opportunity to offer the card while a customer is making travel reservations with a travel representative—either on the phone or in person at the point of sale. The customer will have called a travel representative to make reservations. The travel representative will offer Instant Credit to the customer. If the customer is interested in applying for the card, the travel representative will conference the card issuer in so that the customer can apply for the card for Instant Decision. Once again, there will be a third party on the line (the travel representative will remain on the conference call during the application process). If the customer is instantly approved by the card issuer, the representative will provide the credit card number to the travel representative to complete the travel reservation. A single authorization will apply for Merchant Remote transactions.

XXVIII. Balance Transfer Processing

A notable feature that can be utilized in conjunction with any of the embodiments described herein is the provision of Instant Balance Transfer Processing.

In order to process the balance transfer request, the Applicant preferably should have (a) passed verification, (b) passed a level of identity verification as outlined by Fraud, and (c) received an initial disclosure statement (RICA). The requirements outlined in this section primarily describe some preferred infrastructures to process balance transfer requests via the AFSICE.

In some cases, rather than completing the entire balance transfer from an Applicant instantly at the point of providing Instant Decisioning, the balance transfer request is instantly "requested" and pended, but not immediately processed.

While the invention has been described in detail above, the invention is not intended to be limited to the specific embodiments described herein. Those skilled in the art may make modifications of and departures from the specific embodiments described herein without departing from the inventive concepts herein as defined by the appending claims. Among other things, it is contemplated that various features of the above-described embodiments can be employed within other embodiments described herein where appropriate and/or omitted as appropriate based on the entire teachings herein. While various preferred embodiments have been described, it is contemplated that the various features within all such embodiments can be combined and/or omitted where appropriate by those in the art.

What is claimed is:

1. A computer-implemented method comprising:
   receiving, by an Account Fulfillment System Instant Credit Engine (AFSICE) executing in a computer, a credit application containing customer data transmitted from an information input device;

creating, by the AFSICE executing in the computer, in real-time an instant credit record based on the customer data contained within the credit application, wherein the instant credit record comprises one or more data fields storing customer data, and wherein at least one data field of the instant credit record is a credit risk score and at least one data field indicates a type of product sought in a transaction;

generating, by the AFSICE executing in the computer, in real-time a credit file associated with the instant credit record based upon the customer data received from the information input device;

transmitting, by the computer, the credit file to a computer of a credit bureau for a match;

receiving, by the AFSICE executing in the computer, an indication from the credit bureau when there is a perfect match;

identifying, by the AFSICE executing in the computer, a set of dynamic criteria in a criteria database configured to store one or more sets of criteria, based upon the customer data in the instant credit record, wherein each set of dynamic criteria indicates a set of data fields of the customer data and a set of weighted values associated with the set of data fields, and wherein the set of dynamic criteria is identified based upon the type of product sought in the transaction;

generating, by the AFSICE executing in the computer, the credit risk score of the instant credit record using the set of weighted values indicated by the set of dynamic criteria based upon the customer data in the credit application;

upon the AFSICE executing in the computer determining that the instant credit record is a perfect match according to the credit file received back from the credit bureau, and upon determining that the credit risk score exceeds a threshold value indicated in the set of dynamic criteria:

generating, by the AFSICE executing in the computer, in the instant credit record an account number and a mini-financial record according to the customer data, wherein the mini-financial record includes information required to authorize a predetermined number of transactions within a predetermined period of time; and generating, by the AFSICE executing in the computer, a dynamic webpage configured to be rendered at a terminal, wherein the dynamic webpage indicates that the credit application is conditionally approved.

2. The method of claim 1, further comprising periodically batching, by the computer, a plurality of instant credit records along with a plurality of non-instant credit records.

3. The method of claim 1, further comprising enabling, by the computer, only a single transaction using the mini-financial record upon approval until the completion of a full-financial record.

4. The method of claim 1, further comprising issuing, by the computer, credit to a customer at a point of sale.

5. The method of claim 1, wherein the mini-financial record does not include the account number.

6. A computer implemented method comprising:
upon receiving, by an Account Fulfillment System Instant Credit Engine (AFSICE) executing in a computer, from an information input device associated with a transaction, a machine-readable credit application file containing customer data:
assigning, by the AFSICE executing in the computer, a product identifier from a database to the credit application file containing the customer data received from the information input device based upon a product offering associated with the transaction identified by the customer data of the application file, wherein the database stores one or more tables containing one or more product identifiers identifying one or more credit products;

identifying, by the AFSICE executing in the computer, a set of dynamic criteria in a criteria database configured to store one or more sets of criteria based upon the customer data, wherein each set of dynamic criteria indicates a set of data fields of the customer data and a set of weighted values associated with the set of data fields, and wherein the set of dynamic criteria is identified based upon at least the product offering associated with the transaction;

generating, by the AFSICE executing in the computer, in real-time the credit risk score of the credit application file using the set of weighted values indicated by the set of dynamic criteria based upon the customer data in the credit application file;

generating, by the AFSICE executing in the computer, a credit product price of the credit product based on the assigned product identifier and the credit risk score; and generating, by the AFSICE executing in the computer, a dynamic webpage configured to be rendered at a terminal, wherein the dynamic webpage indicates that the credit application associated with the credit application file is conditionally approved.

7. The method of claim 6, further comprising determining, by the computer, terms and conditions of the credit product based on the assigned product identifier.

8. The method of claim 6, further comprising assigning, by the computer, the product identifier to the application based on a credit product applied for.

9. The method of claim 8, further comprising assigning, by the computer, a plurality of additional product identifiers based on and respectively corresponding to other credit products applied for within the credit application.

10. The method of claim 9, further comprising assigning, by the computer, respective pricings for said other credit products based on said additional product identifiers.

11. The method of claim 6, wherein the product identifier is based on at least one of a URL accessed or identified by the applicant, an invitation number provided by the applicant, and an instant evaluation of whether the applicant was either an existing card member or a pre-solicited applicant.

12. The method of claim 6, further comprising rendering, by the computer, a conditional approval to the applicant based on further verification analysis to be conducted.

13. A computer implemented method comprising:
upon receiving, by an Account Fulfillment System Instant Credit Engine (AFSICE) executing in a computer, from an information input device a machine-readable credit application file containing customer data including a product being purchased by a customer:
generating, by the AFSICE executing in the computer, an instant credit record based upon the customer data contained within the credit application, wherein the instant credit record comprises one or more data fields storing customer data, and wherein at least one data field of the instant credit record is a credit risk score;

identifying, by the AFSICE executing in the computer, a set of dynamic criteria in a criteria database configured to store one or more sets of criteria based upon the customer data in the instant credit record, wherein each set of dynamic criteria indicates a set of data fields of the customer data and a set of weighted values associated with the set of data fields, and wherein the set of dynamic criteria is identified based upon the product being purchased by the customer;

generating, by the AFSICE executing in the computer, in real time the credit risk score of the instant credit record using the set of weighted values indicated by the set of dynamic criteria based upon the customer data in the credit application;

upon determining, by the AFSICE executing in the computer, that the credit risk score exceeds a threshold value indicated in the set of dynamic criteria:

generating, by the AFSICE executing in the computer, in the instant credit record an account number for an account associated with the instant credit record;

pre-populating, by the AFSICE executing in the computer, an electronic wallet of the account associated with the instant credit record, with the generated account number; and generating, by the AFSICE executing in the computer, a dynamic webpage configured to be rendered at a terminal, wherein the dynamic webpage indicates that the credit application is conditionally approved.

14. The method according to claim 13, wherein the instant credit record comprises at least one field selected from the group consisting of name, social security number, address, time at an address, state, zip code, and date of birth.

15. The method according to claim 13, further comprising determining, by the computer, whether the instant credit record matches a record at the credit bureau.

16. The method according to claim 15, wherein a match occurs when the record is the same.

* * * * *